March 4, 1969   M. KOLBERT   3,431,495
COMMUNICATION BETWEEN SUBMARINE AND AIRCRAFT
Filed June 16, 1965

INVENTOR.
MELVIN KOLBERT
by Ernest Greenwald
ATTORNEY.

March 4, 1969     M. KOLBERT     3,431,495

COMMUNICATION BETWEEN SUBMARINE AND AIRCRAFT

Filed June 16, 1965     Sheet 2 of 2

INVENTOR,
MELVIN KOLBERT
ATTORNEY.

United States Patent Office 3,431,495
Patented Mar. 4, 1969

3,431,495
COMMUNICATION BETWEEN SUBMARINE
AND AIRCRAFT
Melvin Kolbert, 24 Hollywood Drive,
Plainview, N.Y. 11803
Filed June 16, 1965, Ser. No. 464,422
U.S. Cl. 325—28   9 Claims
Int. Cl. H04b 13/02

ABSTRACT OF THE DISCLOSURE

The system outlined is a communication system transmitter and receiver that employs a rotating dipole as a means of generating a modulated magnetic field capable of communication through salt water and/or air such as between an aircraft and submarine.

---

The present invention relates generally to communication systems. It relates more specifically to communication systems that can penetrate air and salt water and is intended for use between aircraft, surface ships and submarines, i.e. any combination of vessels having a water and/or air interface.

Effective communication between submarines, surface ships, and aircraft is an obviously important requirement for many reasons. Thus if, for example, during maneuvers a submarine runs into operational difficulty while submerged it is important that it be able to communicate its position and identity to a surface ship or aircraft although such ship or aircraft may be a considerable distance away. Also, during wartime it is desirable and in fact imperative in carrying out successful assaults on the enemy with a dynamic hunter-killer team, which may comprise a submarine and an aircraft, to have an effective communication system therebetween which will be powerful enough as not to unduly limit the distance of transmission and reception and which moreover will not be susceptible to interception or jamming by the enemy.

Though a number of communication systems have been developed to provide communication links, some suffer in their effectiveness because they require multiple stage links, other systems are sensitive to the direction or maneuvers of the aircraft or submarine, and the remainder, because of the frequency of signal transmission employed, are ineffective in salt water beyond a minimal depth.

Sonar systems have been used in multiple stage links and are of course known for use on submarines. The problem with sonar is that sound reflects and refracts in the water as it passes through non-uniform water densities. By the reflecting and refracting of signals, noise is generated to the extent that the information received is virtually incoherent. Ships moving at any speed frequently create additional noise. In order to extend as far as possible the distance of transmission, destroyers and submarines employ sonar systems which are massive and require high-power input. In communicating to and from aircraft, due to the interface of water and air, sonar cannot be employed. Thus, a two-station or stage communication link has of necessity been employed. Sonar signals are in such instances transmitted by the submarine to a buoy which then relays the signal to the aircraft at radio frequencies. Conversely, the aircraft transmits at radio frequencies to the buoy and the buoy retransmits sonar to the submarine. Due to the expendibility of the buoy, the buoy should desirably be cheap and small. However, this is not possible in view of the size and power requirements of the components of the system. Furthermore, initial contact between aircraft and submarine cannot be made unless knowledge of submarine and aircraft position are known. The initial link is not possible unless some other contact method is employed.

Communication systems using coil transmitters which transmit in a frequency of the so-called radio electromagnetic waves have been considered; but the power and weight requirements are excessive and render such systems impractical. It is known that the transmission range of radio electromagnetic waves for a fixed input power increases in air but decreases in salt water as a function of frequency. Also, antenna systems including coil receivers and transmitters have sensitivities proportional to $Kd\phi/dt$ (change of flux per unit time). Such systems are frequency limited in the high and low frequency spectrum, noise becoming the limiting factor and including noise generated by motion of the aircraft and submarine man-made noise, geomagnetic noise and instrumentation noise. In order to transmit through this noise, brute force methods have been employed. Tremendous power has been employed which has necessitated the use of either an inordinately large coil transmitter or one which became exceedingly hot due to high power dissipation density. To overcome the power and size limitations, high power pulses of short duration were employed. This method produced high peak power at low repetition rates; but, due to the short duration of pulse duty cycle the transmitted carrier frequency was not governed by the repetition rate but instead by the Fourier high frequency spectrum of the pulse. The transmission of short coded messages was considered where the thermal storage capacity of the coil permitted high power for very short durations. This short duration however also limited the system. The size and power requirements of the coil system made it impossible to use the system for aircraft transmission. Moreover, because the coil transmitter produces a dipole signal, a communication system using such a transmitter would be directional; aircraft would be limited to flying in only one area while communicating. Although an omni-signal (nondirectional) can be obtained by employing two coils per transmitter mounted 90° to each other and phased electrically 90° to each other, the weight and power requirements would double and would, therefore, be ruled out as being economically and physically impractical for use on aircraft. Additionally, because of the higher frequency of transmission needed in a system utilizing a coil transmitter, the depth of salt water penetration of the signal would be limited as would the system itself.

Another example of a communication system which is sensitive to direction or movement of the aircraft or submarine and which also suffers from lack of depth of water penetration when transmission is made from an aircraft or a surface ship to a submarine is one utilizing a training wire antenna. Such system is not only highly directional, but to obtain any useful signal in salt water the trailing wire would have to be 20 to 30 thousand feet (approximately 4 to 6 miles) long for operation at optimum frequencies. This type of system has been used for short ranges in specific directions. However, the submarine trailing wire limits the submarine maneuverability as well as its velocity. Further, the wire is susceptible to breakage with increased submarine speed. Turns are difficult if not impossible during communication and wire fouling is a major problem. Antenna tuning is also difficult. Aircraft trailing wires have also been suggested for use but no aircraft designer would consider this seriously for obvious reasons.

Ultra-low frequency communication systems have also been employed, these systems utilizing 10–30 kc. continuous wave frequency to penetrate salt water but with limited success since water attenuation increases as frequency increases. Ultra-low frequency carrier communications systems generally employ a multi-megawatt land based transmitter and a magnetic coil receiving antenna on the submarine. The system has a range capaiblity of many hundreds of miles in air but exhibits only limited depth of salt water penetration (feet). The 10–30 kc. frequency is chosen for optimum air travel and shallow water penetrations.

With the foregoing in mind it is an object of the invention to provide a communications system which will be effective to permit communication between submarines, surface vessels and/or aircraft over considerable distances. Another object of the invention is to provide a communications system which operates at a frequency which is outside the noise frequencies resulting from sharp attitude variation or from electrical circuits or rotating magnetic components which do not form part of the communications system.

An additional object of the invention is to provide a communications system which is relatively inexpensive and of sufficiently light weight and low power requirements as to make the same useable on aircraft.

An additional object is to eliminate local and directional noise.

A still further object of the invention is to provide a system capable of transmitting a non-directional signal useful for cross vectoring the position of an underwater or surface craft.

The foregoing objects are achieved in accordance with the invention by providing a magnetic communications system which produces a series of repetitive signals comprising a modulated magnetic field, the modulation being within a range acceptable to water transmission; i.e., from 10–60 cycles per second. This is accomplished by preferable rotation from, for example, 10 to 60 cycles per second of a means for generating a magnetic field of sufficient intensity and modulating such magnetic field under control of an intelligence signal which is the signal component of the modulated magnetic field being detectable by suitable receiving equipment forming part of the system.

Other objects and advantages of the invention will be apparent from the detailed description of one illustrative embodiment of the invention which follows an conjunction with the accompanying drawings, in which.

Figure 1:
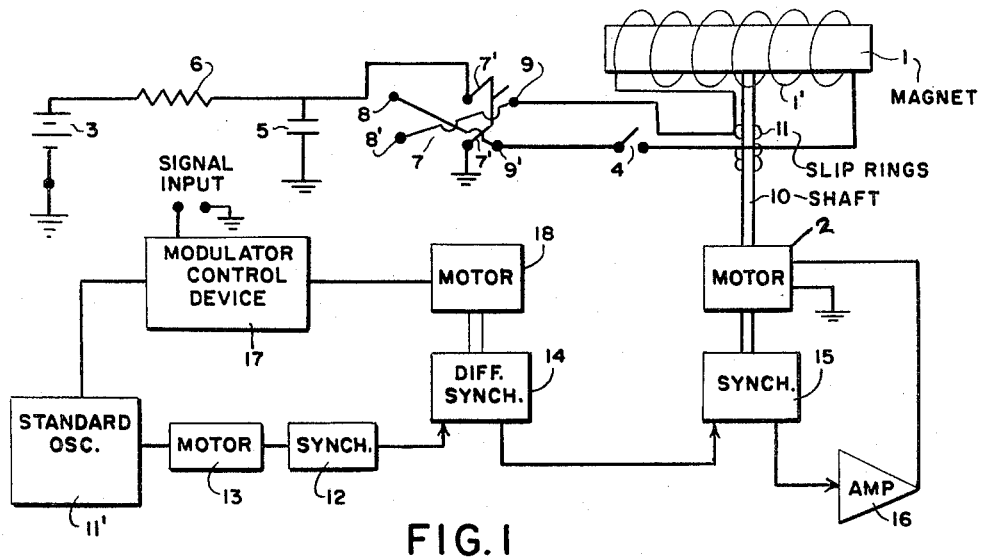
FIG. 1 illustrates the transmitter portion of the communications systems.

Referring to FIG. 1, I have schematically illustrated an arrangement which can be employed for the transmitter portion of the communications system. Preferably, I utilize an uncharged magnet 1 which may be an alnico mounted horizontally on a submarine, aircraft or surface ship. The magnet, in such instance, would be mounted for rotation about a vertical axis by a drive motor 2. For maximum efficiency, the magnetic system should be exterior to the submarine or hull of a surface ship. When employed on aircraft, it may be mounted in the aircraft skin. Furthermore, in order to have low drag and minimize attenuation when the submarine is submerged, the magnetic system should preferably be enclosed in a non-conducting pod. When it is desired to communicate from the submarine to a surface ship or aircraft, either of which would have suitable receiving equipment, a voltage of suitable magnitude, i.e. 400 volts, from a voltage source 3 is applied to the coil of wire 1' through charging switch 4. The voltage actually applied to the coil of wire 1' is that which is available at capacitor 5 which is slowly charged through resistor 6 to the voltage level of the voltage source 3. When it is desired to energize the coil of wire and in turn charge the alnico magnet, the center pole of switch 7, which preferably constitutes a double pole-double throw reversing switch, is moved into one or another of its positions. Thus, for example, when the movable arms 7' of the double pole, double-throw switch are moved into connection with terminals 8, 8', the current will flow through the coil of wire in one direction and when the movable arms are moved into connection with terminals 9, 9' current will flow through the coil of wire in an opposite direction. In either instance, that is, whether the movable arm is in connection with terminals 8 and 8' or 9 and 9' the capacitor 5 will discharge when the switch 7 is moved from one of the pairs of terminals 8 and 8' to the other pair 9 or 9' or vice versa. The sole purpose in utilizing a reversible switch is to demagnetize the previously magnetized alnico magnet by reversing current flow through the coil of wire. Demagnetization of the magnet prevents enemy aircraft or surface ships in the vicinity of the submarine from detecting the presence of the submarine by virtue because of the elimination of any magnetic field which would otherwise be present if a permanent, continuously charged, magnet were employed.

The advantage of utilizing a coil of wire and the charging circuit heretofore described is that it permits the use of high current, high peak power, and short duration pulses for the production of a residual field in the alnico magnet. Obviously, more than one pulse may be required to completely charge the magnet. Advantageously, total energy required is small as the duration of the pulse is short.

The drive motor 2 drives the shaft 10 upon which the alnico magnet is mounted for rotation, the shaft carrying slip rings 11 for connecting the voltage available at source 3 to the coil of wire 1'. Also the drive motor is advantageously activated and rotated at a synchronous speed under control of a standard oscillator 11' which operates at a pre-selected frequency and which may, for purposes of this disclosure, be anywhere between 10 to 60 cycles per second.

Between the standard oscillator and the motor drive 2 is provided a servo loop which includes a synchro 12 driven by synchronous motor 13 under control of the standard oscillator 11'. The output of synchro 12 is fed to a differential synchro 14 the output of which is connected to a synchro control receiver 15 which in turn is driven by drive motor 2. The output of synchro 15 is supplied to the input of amplifier 16 the output of which drives motor 2.

To improve signal to noise ratio at the receiver, to be described hereinafter, and to avoid signal jamming and signal interception by the enemy, I advance or retard the rate of rotation of the magnet and for this purpose include a modulation control device 17 which serves to frequency modulate the output of the standard oscillator 11' at a predetermined rate. For signal transmission I may utilize a "+," "−," hereinafter also referred to as a "yes," "no" signal for signal coding; i.e. Morse code, such signals being supplied at selected intervals and sequence. In any event, the "yes," "no" signal is also supplied as an input to the modulation control device 17 and serves to phase modulate the frequency modulated carrier, which, as indicated, may be within the frequency range of from 10 to 60 cycles per second. The frequency modulated carrier when phase modulated by the "yes," "no" signal is advanced or retarded in phase by such signal with respect to the frequency modulated carrier. The phase modulated frequency modulated carrier is fed to a synchro motor 18 which drives differential synchro 14. With the described arrangement, the output of differential synchro 14 to synchro 15 will be the sum of its inputs from synchro 12 and motor 18, the synchro 12 supplying a signal referenced to the standard oscillator 11' and motor 18 supplying a signal also referenced to oscillator 11' but rate and signal controlled. It will thus be appreciated by those skilled in the art, that differential synchro 14 by virtue of its described connections with motor 18 and synchro 12, serves to advance or delay the rotation of the magnet 1 with reference to its rotational frequency as governed by oscillator 11'.

I preferably delay or advance the synchronization of the magnet 1 in phase by 180°, under control of the modulation control device 17 in order to produce a magnetic field which is positively or negatively referenced to an aircraft receiver standard oscillator corresponding to oscillator 11' and modulation rate control device 17 in the transmitter portion of the system.

Since as an aircraft passes a communication submarine a phase change will be noted which may confuse signal communication, I utilize, as will hereinafter be more fully described, a vertical axis rotating table in the receiver portion of the system, such table being slaved to magnetic field responsive means to permit maximum signal reception by a signal magnetometer also in the receiver portion of the system. This arrangement also permits determination of submarine position by the vectoring of its position by triangulation as will be apparent to those skilled in the art.

From the description thus far given of the arrangement illustrated in FIG. 1, it will be apparent that a transmitter is provided which establishes a D.C. magnetic field once switch 7 is thrown into an appropriate position, which field is rotated by motor 2 at a frequency determined by the frequency of the standard oscillator and modulated by device 17 to primarily afford signal communication by providing a magnetic field which is positively or negatively referenced to an aircraft standard oscillator, and secondarily to permit determination of relative positions of a submarine and an aircraft.

For a speed-up of signal communication, pre-written commands based on digital numbers corresponding to predetermined coded messages can be transmitted from the transmitter on a submarine to an aircraft.

Figure 2:
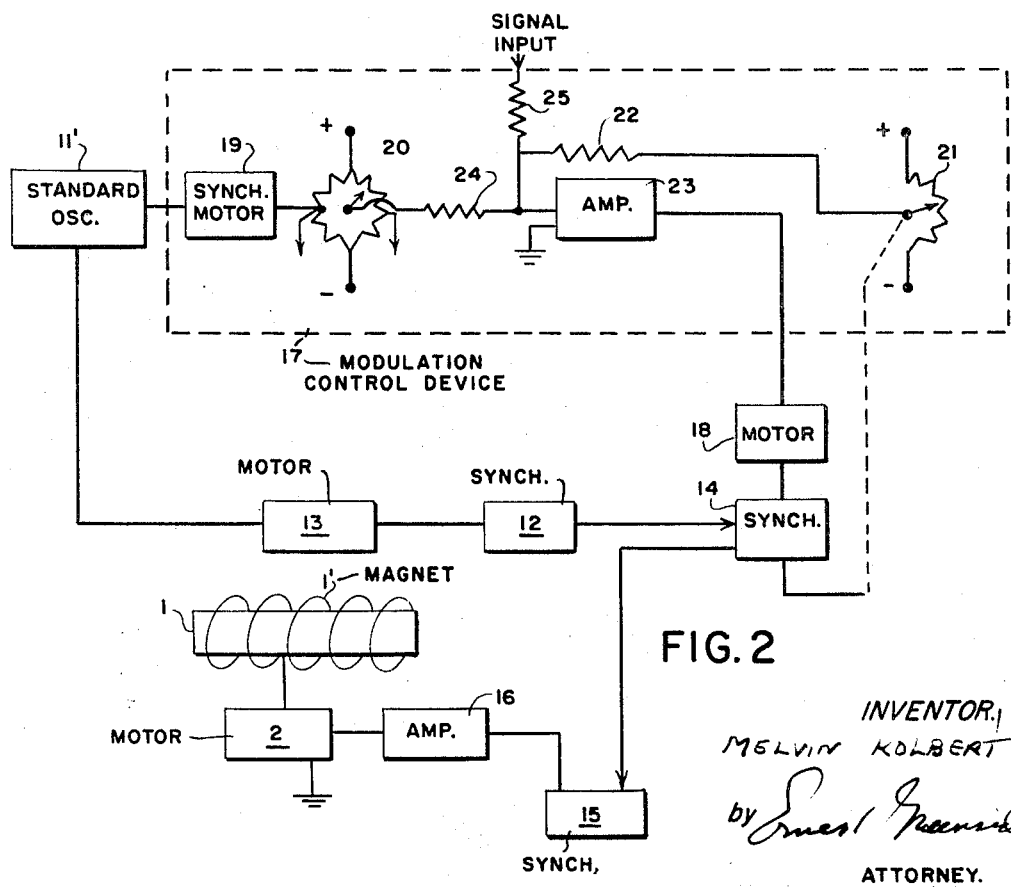
FIG. 2 is a more specific showing of the transmitter portion of the system.

FIG. 2 also illustrates the transmitter portion of the system, the modulation control device 17 being however shown more specifically. Like components in FIGS. 1 and 2 have been identified with the same reference numerals. Moreover since the system of FIG. 2 operates in precisely the same manner as the system described with respect to FIG. 1, a further detailed description of FIG. 2 is not considered necessary.

From FIG. 2 it will be noted that the modulation control device 17 includes a synchro motor 19 which is driven by the standard oscillator 11', the output of synchro motor 19 driving a non-linear potentiometer 20. In order to insure that motor 18 will follow the nonlinear output of potentiometer 20 I preferably utilize a second potentiometer 21 which comprises a linear potentiometer the rotatable arm of which is connected through isolating resistor 22 to the input of amplifier 23. The output of non-linear potentiometer 20 is also connected to the input of amplifier 23 through an isolating resistor 24. The input "yes," "no" signal is additionally applied to the input of amplifier 23 through isolating resistor 25. With the described arrangement it will be evident that the output of amplifier 23 which energizes motor 18 will comprise not only a rate controlled signal (which is a function of the non-linear potentiometer output) but also a signal which is modulated by the "yes," "no" input signal. The linear potentiometer 21, as will be apparent to those skilled in the art, serves as a feed back for the purpose hereinbefore described, that is to insure that motor 18 will faithfully follow the non-linear output of potentiometer 20. Isolation resistor 22 serves to isolate the signal input voltage and that derived from potentiometer 20 from potentiometer 21. Isolation resistor 24 serves to isolate the signal input voltage and the voltage from linear potentiometer 21 from the non-linear potentiometer 20. Isolation resistor 25 serves to isolate the voltages at potentiometers 20 and 21 from a suitable signal input source.

Before considering the receiver portion of the communication system, it will be obvious that with a transmitter of the type disclosed, due to the cubed law of attenuation or inverse cubed law of range of a magnetic signal, and eddy current attenuation, tremendous useable gain is required to monitor the signal generated at the transmitter. The inverse cube law being a distinct advantage since it will render jamming by the enemy literally impossible as well as reception of transimtter data or information if the enemy is a short distance away. If the enemy is to be capable of intercepting communication between a submarine and a friendly aircraft, it would have to have knowledge of the specific frequency of the standard oscillator and the modulation rate of device 17. For example, enemy frequency scanning to locate the frequency of operation would of necessity have to be slow to be of any use as it would pass through the frequency of operation without indication if it passed faster than the modulation frequency rate.

Figure 3:
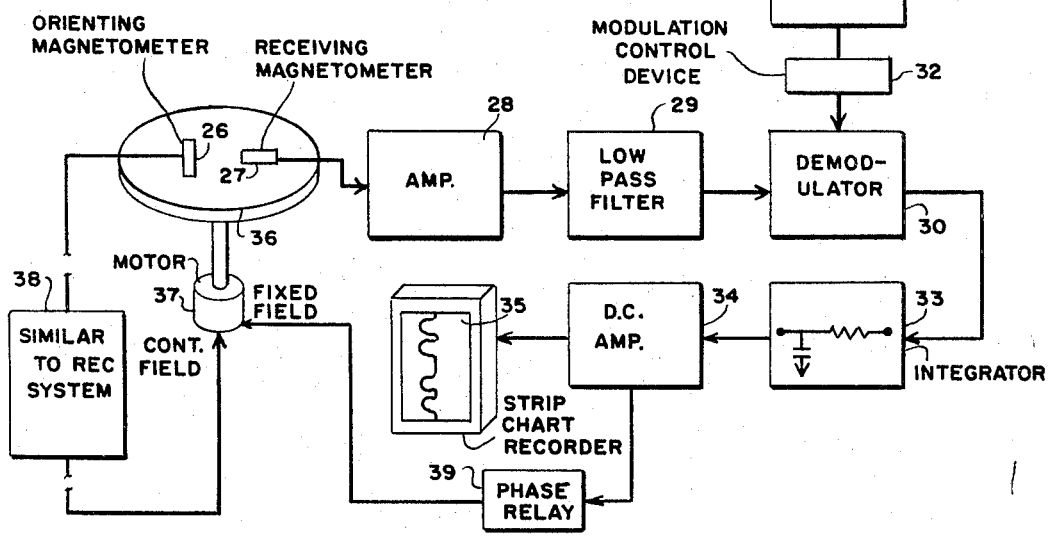
FIG. 3 illustrates the receiver portion of the system.

Reference will now be had to FIG. 3 which illustrates the receiver portion of the communication system. As shown in FIG. 3, I preferably utilize a pair of magnetometers 26 and 27, magnetometer 26 being referred to, for convenience, as an orienting magnetometer and magnetometer 27 as a receiving magnetometer, although it is to be understood that a single magnetometer could be employed where high signal sensitvity is not required. Preferably each of the magnetometers comprises an electron beam magnetometer, or the like, which is sensitive to flux density and not $d\phi/dt$ as is a receiving antenna coil or drag wire previously described. A decrease in operational frequency does not limit the magnetometer as would be the case when using a coil or drag wire. Though the electron beam magnetometer is preferred, other magnetometers can be employed.

The frequency range of the electron beam magnetometer is essentially flat within the frequency range contemplated, i.e., 10–60 cycles per second. If necessary, the electron beam tube magnetometer visualized for use in my receiver system can be improved by a factor of 100 to a 1,000 times by employing Mu metal flux focusing, which technique is employed in the F. W. Bell Hall Effect Probe, as is well known to those skilled in the art. One advantage of utlizing the Mu metal is that it produces a directional receiving antenna which eliminates a large percentage of side lobe noise. A typical output of a beam magnetometer is 100 volts per gauss or 1 millivolt per milli-gamma. Desirably the output of a magnetometer is amplified and filtered in small incremental gain stages to eliminate the chance of oscillation.

More specifically, having reference to FIG. 3, the output of receiving magnetometer 27 will comprise a signal having a center frequency between 10–60 cycles per second, modulated at a rate determined by modulation rate control device 17 in the transmitter and by the intelligence signals (yes, no) transmitted therefrom. Such output is fed to a standard D.C. amplifier 28, the output of which is connected to a low pass filter 29, which may comprise an R-C network, and serves to eliminate that portion of the noise outside the filter pass band frequency which will be determined by the frequency of modulation of the transmitted signal. The output of the low pass filter 29 is fed to a standard phase demodulator 30, which for the purpose of recovering the intelligence signals transmitted at the transmitter, has a reference signal fed thereto which is identical to the frequency-modulated carrier derived from modulation control device 17 in the transmitter section of the system. This reference signal is provided in the receiver portion of the system by a standard oscillator 31 and a modulation rate control device 32 which advantageously may correspond to the oscillator 11' and modulation rate control device 17, respectively, in the transmitter portion of the system. The output of the demodulator 30, comprising the intelligence signals and high frequency noises, is fed to an integrator 33, the purpose of which is to eliminate as much of such high frequency noise as possible, thereby providing at the output of integrator 33 a signal having a relatively high signal to noise ratio, such signal being fed to a D.C. amplifier 34, the output of which may be applied to a strip chart recorder 35. Alternatively the output of amplifier 34 may be connected to an electronic decoding device if automatic decoding is required. The integrator 33 is perferably comprised of an R-C network.

As previously mentioned, as an aircraft passes a communicating submarine, the aircraft will be passing through the D.C. magnetic field generated by the submarine and a phase change will be noted. This would normally confuse communication. To avoid this, is a vertical axis rotating table 36 is employed in the receiver which is slaved to the orienting magnetometer 26 mounted perpendicularly to the receiving magnetometer 27, the arrangement being such that the table will at all times be oriented under control of the orienting magnetometer 26 to provide a maximum signal to the receiving magnetometer 27. Furthermore, as indicated, because the table is oriented under control of magnetometer 26, submarine position can be determined by triangulation. By triangulation of the submarine's direction from a few points in the aircraft's path, the submarine's position can be automatically computed.

In order that the table 36 be properly oriented to permit maximum signal reception by the receiving magnetometer 27 a servo loop is employed between the orienting magnetometer 26 and motor 37 which drives the table 36, such servo loop preferably comprising an arrangement similar to that used in conjunction with the receiving magnetometer. This is generally indicated in FIG. 3 by the box 38. The purpose of the phase relay 39 in the servo loop is to maintain the platform orientation irrespective of the phase of the transmitted signal. This is accomplished by the phase relay 39 which is connected to the output of D.C. amplifier 34 and functions as a reversing switch to alter the phase of the fixed field winding of motor 37 by 180° when the received signal sensed by the receiving and orienting magnetometers vary 180°. This will prevent the platform 36 from slewing 180° as "yes," "no" signals are received. It will be understood that the arrangement within box 38 does not include a phase relay and that the continuous field of motor 37 is energized by the output of a D.C. amplifier, which is similar to amplifier 34, at the output stage of the servo loop in box 38.

The magnetometer platform may also be slaved to a compass in the aircraft to eliminate signal ambiguity that might be caused by a plane changing its course. The manner in which the magnetometer may be slaved to a compass is well known to those skilled in the art; i.e. the platform could be differentially controlled in a fashion similar to the manner in which a gyro is slaved to a compass.

Figure 4:
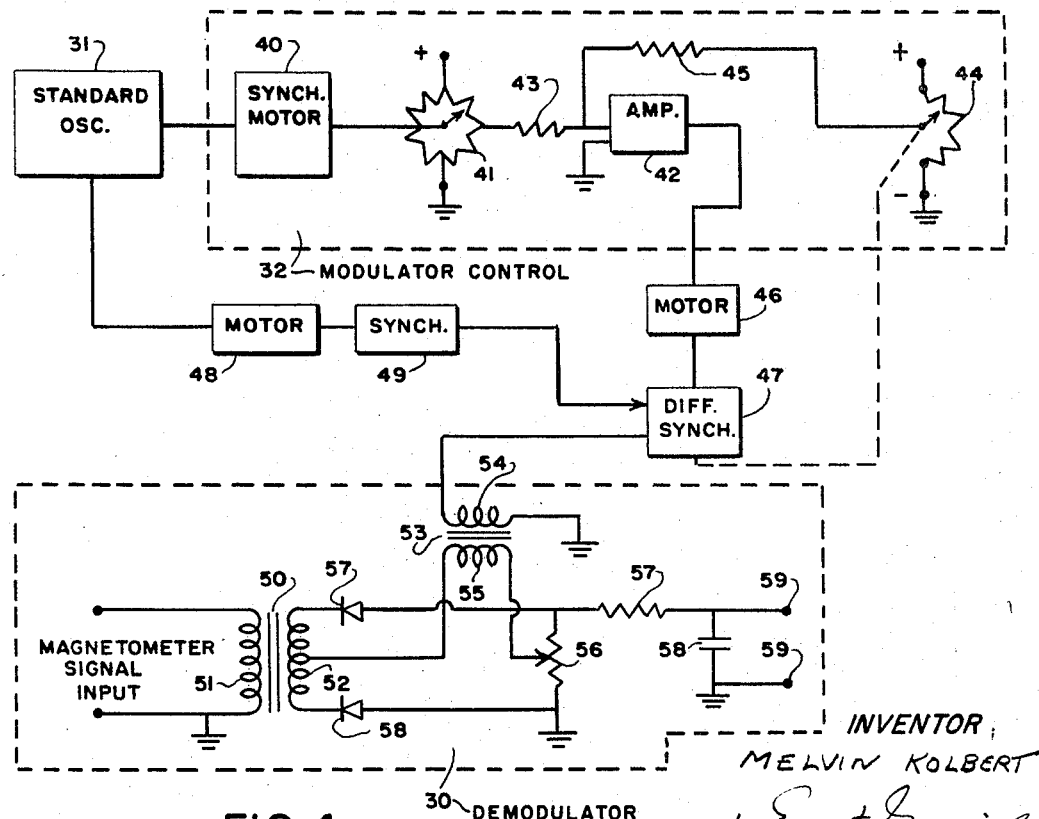
FIG. 4 is a more specific showing of the receiver portion of the system.

FIG. 4 illustrates more specifically components 30 and 32 shown in FIG. 3 and the manner in which these components cooperate with the standard oscillator 31 in the receiver. In FIG. 4 the box identified by reference character 32 includes the components making up the modulation control device which, as will be noted from a comparison with FIG. 1, are essentially the same as shown in FIG. 1 excepting that an input signal is not applied to the amplifier as in FIG. 1. Thus, as will be apparent from FIG. 4, standard oscillator 31 is connected to a synchro motor 40 which preferably is identical to synchro motor 19 utilized in the transmitter portion of the system. Synchro motor 40 is connected to a non-linear potentiometer 41 the output of which is applied to amplifier 42 through isolating resistor 43. The non-linear potentiometer 41, amplifier 42 and resistor 43 are preferably identical to the non-linear potentiometer 20, amplifier 23 and isolating resistor 24 utilized in the transmitter portion of the system. Furthermore a linear potentiometer 44 corresponding to linear potentiometer 21 in the transmitter portion of the system is utilized for the same purpose as in the transmitter section and is connected to the input of the amplifier 42 through isolating resistor 45 which may be identical to isolating resistor 22 in the transmitter section. The output of amplifier 42 drives a motor 46, corresponding to motor 18 in the transmitter, said motor 46 in turn driving differential synchro 47 which corresponds to differential synchro 14 in the transmitter section of the system. In order that the output of the differential synchro be referenced to the standard oscillator 31, differential synchro 47 is operatively connected to the standard oscillator 31 by means of motor 48 and synchro 49 both of which may correspond structurally to motor 15 and synchro 12 in the transmitter section of the system. The output of differential synchro is supplied to the demodulator 30 and comprises a frequency modulated carrier which is scanned at the same rate as the carrier is scanned in the transmitter portion of the system. In other words the output of the differential synchro 47 is a rate controlled signal which corresponds to the rate controlled signal in the transmitter before it is phase modulated by the "yes," "no" intelligence.

The demodulator 30 comprises a transformer 50 having a primary winding 51 and a center tapped secondary winding 52. The magnetometer output is supplied to the primary winding 51 of transformer 50. As will be apparent to those skilled in the art the magnetometer output will contain the phase modulated frequency modulated carrier and in order to recover the intelligence; i.e. the "yes," "no" signals it is necessary to beat with the magnetometer signal the rate controlled signal derived from differential synchro 47. For this purpose a second transformer 53 is provided across the primary winding 54 of which is connected the output from differential synchro 47. The secondary winding 55 of transformer 53 is connected to the center tap of secondary winding 52 of transformer 50 and the movable arm of a potentiometer 56 electrically connected to the opposite ends of secondary winding 52 of transformer 50 by means of rectifiers 57 and 58. The demodulated output, i.e. the "yes," "no" signal will be available across potentiometer 56 and if further filtering is desired the output can be fed through a filter comprised of resistor 57 and condenser 58. The signal output voltage available across terminals 59 is connected to the input of D.C. amplifier 34.

To improve the signal to noise ratio to enable reception of weak signals I may further employ a local field noise rejection arrangement. This can be implemented by employing a dual receiver system each of which is disposed within an aircraft at remote locations with respect to each other. The receivers are disposed so that noise generated within the aircraft between the receivers will be 180° out of phase when sensed by the receiver. With respect however to signals received far from the aircraft compared to the distance between the receivers in the aircraft, both the far-field signals and far-field noise will be received equally and in phase. The arrangement is accordingly such that when both receiver signals are added, the far-field signal will increase and the near-field noise will decrease. Preferably the arrangement is such that should the individual receivers receive equal near-field noise the summation of the near-field noise signals will produce zero noise. If the near-field signals are such that their summation is not zero, I contemplate adjusting the gain of the receivers until the near-field noise of one is again equal and 180° out of phase with the other. By virtue of the elimination of near-field noise it will be obvious that additional gain of useable signal signal will be available. This pre-supposes a single near-field noise generator.

What I claim is:

1. In a communicating system, transmitter apparatus comprising means for generating a magnetic field, including a magnet, electromotive means for rotating said magnetic field generating means at a predetermined frequency, and control servo means for modulating the frequency of rotation of said rotating means in accordance with intelligence signals adapted to be transmitted to a receiver.

2. A system according to claim 1, including predetermined time programming means for scan frequency modulating the frequency of rotation of said rotating means.

3. In a communicating system, transmitter apparatus comprising means for generating a magnetic field including a magnet and electromotive, means for rotating said magnetic field generating means, predetermined time programming means controlling the rate of rotation of said rotating means at a predetermined frequency, and servo controlled means for advancing or retarding the rate of rotation of said rotating means with respect to said predetermined frequency.

4. In a system according to claim 3, wherein said magnetic field generating means comprises a wire wound about a magnet to permit a capacitor discharge current passed therethrough, through slip rings said means for rotating said magnetic field generating means comprising a drive motor, said means controlling the rate at predetermined time of rotation of the drive motor comprising a servo loop operated under control of an accurate time standard oscillator.

5. In a system according to claim 4, wherein said servo loop includes a differential synchro which is driven by a motor at a predetermined program, and a modulation control device having as an input the output of said standard oscillator and an output connected to said motor rotational control.

6. In a system according to claim 5, wherein said modulation rate control device has a second input, and a source of intelligence signals operatively connected to said second input, which consists of phase shifting the predetermined signal by 0 or 180 degrees.

7. In a system according to claim 4, wherein said coil of wire is electrically connected to a source of current a capacitor by means of a reversing switch through a slip ring, which can discharge the capacitor to charge or discharge the magnet.

8. In a system according to claim 7, wherein a series connected resistor and condenser having a time constant for charge and large charge are connected across said source of current, said reversing switch having its movable arms connected at the juncture of the connection of the resistor and condenser.

9. A communication system having a transmitter portion comprising means for generating a magnetic field, including a magnet, electromotive means for rotating said magnetic field generating means at a predetermined frequency, and servo means for modulating the frequency of rotation of said rotating means in accordance with intelligence signals adapted to be transmitted to a receiver to thereby generate magnetic fields which are intelligence signal modulated, said system including a receiver portion comprising means sensitive to and translating magnetic fields, which are intelligence signal modulated, into electrical signals, amplifier means for amplifying said electrical signals, demodulator means having as one input a predetermined stored reference signal and as a second input said electrical intelligence signals, the output of the demodulator comprising said intelligence signal, and means for amplifying said intelligence signal.

References Cited

UNITED STATES PATENTS

| 2,519,094 | 8/1950 | Zuschlag | 324—4 |
| 2,772,391 | 11/1956 | Mackey | 324—.5 |
| 2,899,637 | 8/1959 | Stein | 324—4 X |
| 3,328,698 | 6/1967 | Schreder | 325—304 |

ROBERT L. GRIFFIN, *Primary Examiner.*

A. J. MAYER, *Assistant Examiner.*

U.S. Cl. X.R.

324—4